United States Patent
Wang et al.

(10) Patent No.: US 7,746,928 B2
(45) Date of Patent: Jun. 29, 2010

(54) METHOD AND APPARATUS FOR PROVIDING RATE CONTROL

(75) Inventors: Limin Wang, San Diego, CA (US); Xue Fang, San Diego, CA (US)

(73) Assignee: General Instruments Corporation, Horsham, PA (US)

(*) Notice: Subject to any disclaimer, the term of this patent is extended or adjusted under 35 U.S.C. 154(b) by 1553 days.

(21) Appl. No.: 11/026,406

(22) Filed: Dec. 30, 2004

(65) Prior Publication Data

US 2006/0146928 A1    Jul. 6, 2006

(51) Int. Cl.
  *H04N 7/12*   (2006.01)
  *H04N 11/02*  (2006.01)
  *H04N 11/04*  (2006.01)
(52) U.S. Cl. .............. 375/240.03; 375/240.01; 375/240.02
(58) Field of Classification Search ............... 375/240.01–240.03
See application file for complete search history.

(56) References Cited

U.S. PATENT DOCUMENTS

| | | | | | |
|---|---|---|---|---|---|
| 5,949,490 | A | * | 9/1999 | Borgwardt et al. | 375/240.05 |
| 6,115,421 | A | * | 9/2000 | Katta et al. | 375/240 |
| 6,151,362 | A | * | 11/2000 | Wang | 375/240.12 |
| 7,054,371 | B2 | * | 5/2006 | Kim | 375/240.26 |
| 2002/0163966 | A1 | * | 11/2002 | Ramaswamy | 375/240.03 |
| 2005/0175093 | A1 | * | 8/2005 | Haskell et al. | 375/240.03 |

* cited by examiner

*Primary Examiner*—Marsha D Banks Harold
*Assistant Examiner*—Chikaodili E Anyikire
(74) *Attorney, Agent, or Firm*—Larry T. Cullen

(57) ABSTRACT

The present invention discloses a system and method for providing a rate control to an encoder, e.g., a H.264/MPEG-4 AVC compliant encoder. Specifically, the rate control method computes a target rate for a segment, where the segment comprises at least one slice of macroblocks. In turn, a target rate is computed for the at least one slice of macroblocks from the target rate for the segment. In turn, a quantization parameter ($QP_j$) is computed for a macroblock (j) of the macroblocks from the target rate for the at least one slice. Finally, the macroblock (j) is encoded in accordance with said quantization parameter ($QP_j$).

18 Claims, 2 Drawing Sheets

US 7,746,928 B2

METHOD AND APPARATUS FOR PROVIDING RATE CONTROL

BACKGROUND OF THE INVENTION

1. Field of the Invention

Embodiments of the present invention generally relate to an encoding system. More specifically, the present invention relates to a rate control method that is employed in a motion compensated encoder.

2. Description of the Related Art

Demands for lower bit-rates and higher video quality requires efficient use of bandwidth. To achieve these goals, the Moving Picture Experts Group (MPEG) created the Moving Picture Experts Group (MPEG) created the ISO/IEC international Standards 11172 (1991) (generally referred to as MPEG-1 format) and 13818 (1995) (generally referred to as MPEG-2 format), which are incorporated herein in their entirety by reference. Although these encoding standards were very effective, new and improved encoding standards, e.g., H.264/MPEG-4 AVC, have been developed.

H.264/MPEG-4 AVC is a new video coding standard that achieves data compression by utilizing the coding tools, such as spatial and temporal prediction, transform and quantization, entropy coding, and etc. Unlike other existing video coding standards, H.264 blends the transform and quantization operations. Hence, the rate control methods designed based upon other existing video coding standards, for example, the MPEG-2 TM5 rate control, may not readily be applicable to H.264 encoder directly.

Thus, there is a need in the art for a rate control method that can be deployed in new encoding standards such as H.264/MPEG-4 AVC.

SUMMARY OF THE INVENTION

In one embodiment, the present invention discloses a system and method for providing a rate control to an encoder, e.g., a H.264/MPEG-4 AVC compliant encoder. Specifically, the rate control method computes a target rate for a segment, where the segment comprises at least one slice of macroblocks. In turn, a target rate is computed for the at least one slice of macroblocks from the target rate for the segment. In turn, a quantization parameter ($QP_j$) is computed for a macroblock (j) of the macroblocks from the target rate for the at least one slice. Finally, the macroblock (j) is encoded in accordance with said quantization parameter ($QP_j$).

In one embodiment, the quantization parameter ($QP_j$) is optionally adjusted in accordance with human eye sensitivity to distortion.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

It should be noted that although the present invention is described within the context of H.264/MPEG-4 AVC, the present invention is not so limited. Namely, the present motion compensated encoder can be an H.264/MPEG-4 AVC compliant encoder or an encoder that is compliant to any other compression standards that are capable of exploiting the present rate control scheme.

Figure 1:
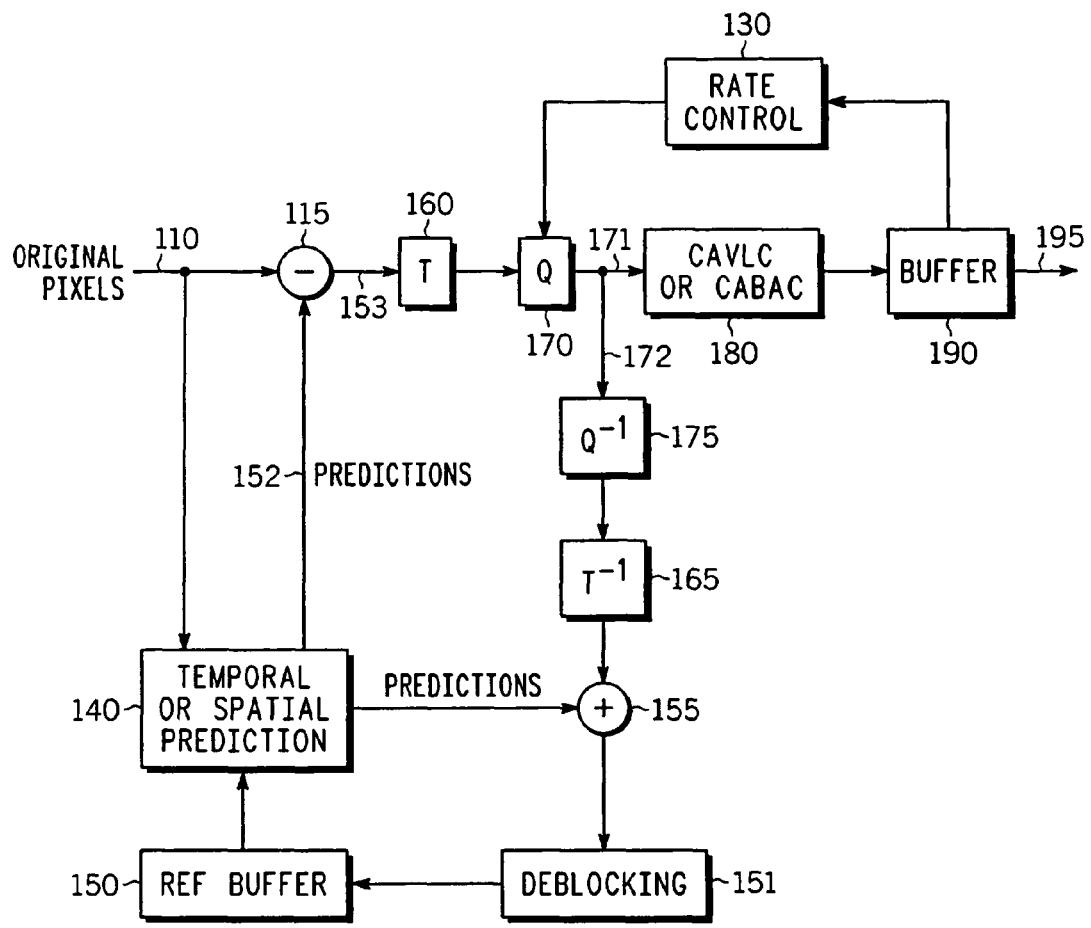
FIG. 1 illustrates a motion compensated encoder of the present invention.

FIG. 1 depicts a block diagram of an exemplary motion compensated encoder 100 of the present invention. In one embodiment of the present invention, the apparatus 100 is an encoder or a portion of a more complex motion compensation coding system. The apparatus 100 comprises a temporal or spatial prediction module 140 (e.g., comprising a variable block motion estimation module and a motion compensation module), a rate control module 130, a transform module 160, e.g., a discrete cosine transform (DCT) based module, a quantization (Q) module 170, a context adaptive variable length coding (CAVLC) module or context-adaptive binary arithmetic coding module (CABAC) 180, a buffer (BUF) 190, an inverse quantization ($Q^{-1}$) module 175, an inverse DCT ($DCT^{-1}$) transform module 165, a subtractor 115, a summer 155, a deblocking module 151, and a reference buffer 150. Although the apparatus 100 comprises a plurality of modules, those skilled in the art will realize that the functions performed by the various modules are not required to be isolated into separate modules as shown in FIG. 1. For example, the set of modules comprising the temporal or spatial prediction module 140, inverse quantization module 175 and inverse DCT module 165 is generally known as an "embedded decoder".

FIG. 1 illustrates an input video image (image sequence) on path 110 which is digitized and represented as a luminance and two color difference signals (Y, $C_r$, $C_b$) in accordance with the MPEG standards. These signals can be further divided into a plurality of layers (sequence, group of pictures, picture, slice and blocks) such that each picture (frame) is represented by a plurality of blocks having different sizes. The division of a picture into block units improves the ability to discern changes between two successive pictures and improves image compression through the elimination of low amplitude transformed coefficients (discussed below). The digitized signal may optionally undergo preprocessing such as format conversion for selecting an appropriate window, resolution and input format.

The input video image on path 110 is received into temporal or spatial prediction module 140 for performing spatial prediction and for estimating motion vectors for temporal prediction. In one embodiment, the temporal or spatial prediction module 140 comprises a variable block motion estimation module and a motion compensation module. The motion vectors from the variable block motion estimation module are received by the motion compensation module for improving the efficiency of the prediction of sample values. Motion compensation involves a prediction that uses motion vectors to provide offsets into the past and/or future reference frames containing previously decoded sample values that are used to form the prediction error. Namely, the temporal or spatial prediction module 140 uses the previously decoded frame and the motion vectors to construct an estimate of the current frame.

The temporal or spatial prediction module 140 may also perform spatial prediction processing, e.g., directional spatial prediction (DSP). Directional spatial prediction can be implemented for intra coding, for extrapolating the edges of the previously-decoded parts of the current picture and applying it in regions of pictures that are intra coded. This improves the quality of the prediction signal, and also allows prediction from neighboring areas that were not coded using intra coding.

Furthermore, prior to performing motion compensation prediction for a given block, a coding mode must be selected. In the area of coding mode decision, MPEG provides a plurality of different coding modes. Generally, these coding modes are grouped into two broad classifications, inter mode coding and intra mode coding. Intra mode coding involves the coding of a block or picture that uses information only from that block or picture. Conversely, inter mode coding involves the coding of a block or picture that uses information both from itself and from blocks and pictures occurring at different times.

Once a coding mode is selected, temporal or spatial prediction module 140 generates a motion compensated prediction (predicted image) on path 152 of the contents of the block based on past and/or future reference pictures. This motion compensated prediction on path 152 is subtracted via subtractor 115 from the video image on path 110 in the current block to form an error signal or predictive residual signal on path 153. The formation of the predictive residual signal effectively removes redundant information in the input video image. Namely, instead of transmitting the actual video image via a transmission channel, only the information necessary to generate the predictions of the video image and the errors of these predictions are transmitted, thereby significantly reducing the amount of data needed to be transmitted. To further reduce the bit rate, predictive residual signal on path 153 is passed to the transform module 160 for encoding.

The transform module 160 then applies a DCT-based transform. Although the transform in H.264/MPEG-4 AVC is still DCT-based, there are some fundamental differences as compared to other existing video coding standards. First, transform is an integer transform, that is, all operations are carried out with integer arithmetic. Second, the inverse transform is fully specified. Hence, there is no mismatch between the encoder and the decoder. Third, transform is multiplication free, requiring only the addition and shift operations. Fourth, a scaling multiplication that is part of the complete transform is integrated into the quantizer, reducing the total number of multiplications.

Specifically, in H.264/MPEG-4 AVC the transformation is applied to 4×4 blocks, where a separable integer transform is applied. An additional 2×2 transform is applied to the four DC coefficients of each chroma component.

The resulting transformed coefficients are received by quantization module 170 where the transform coefficients are quantized. H.264/MPEG-4 AVC uses scalar quantization. One of 52 quantizers or quantization parameters (QP)s is selected for each macroblock.

The resulting quantized transformed coefficients are then decoded in inverse quantization module 175 and inverse DCT module 165 to recover the reference frame(s) or picture(s) that will be stored in reference buffer 150. In H.264/MPEG-4 AVC an in-loop deblocking filter 151 is also employed to minimize blockiness.

The resulting quantized transformed coefficients from the quantization module 170 are also received by context-adaptive variable length coding module (CAVLC) module or context-adaptive binary arithmetic coding module (CABAC) 180 via signal connection 171, where the two-dimensional block of quantized coefficients is scanned using a particular scanning mode, e.g., a "zig-zag" order, to convert it into a one-dimensional string of quantized transformed coefficients. In CAVLC, VLC tables for various syntax elements are switched, depending on already-transmitted syntax elements. Since the VLC tables are designed to match the corresponding conditioned statistics, the entropy coding performance is improved in comparison to methods that just use one VLC table.

Alternatively, CABAC can be employed. CABAC achieves good compression by a) selecting probability models for each syntax element according to the element's context, b) adapting probability estimates based on local statistics and c) using arithmetic coding.

The data stream is received into a "First In-First Out" (FIFO) buffer 190. A consequence of using different picture types and variable length coding is that the overall bit rate into the FIFO is variable. Namely, the number of bits used to code each frame can be different. In applications that involve a fixed-rate channel, a FIFO buffer is used to match the encoder output to the channel for smoothing the bit rate. Thus, the output signal of FIFO buffer 190 is a compressed representation of the input video image 110, where it is sent to a storage medium or telecommunication channel on path 195.

The rate control module 130 serves to monitor and adjust the bit rate of the data stream entering the FIFO buffer 190 for preventing overflow and underflow on the decoder side (within a receiver or target storage device, not shown) after transmission of the data stream. A fixed-rate channel is assumed to put bits at a constant rate into an input buffer within the decoder. At regular intervals determined by the picture rate, the decoder instantaneously removes all the bits for the next picture from its input buffer. If there are too few bits in the input buffer, i.e., all the bits for the next picture have not been received, then the input buffer underflows resulting in an error. On the other hand, if there are too many bits in the input buffer, i.e., the capacity of the input buffer is exceeded between picture starts, then the input buffer overflows resulting in an overflow error. Thus, it is the task of the rate control module 130 to monitor the status of buffer 190 to control the number of bits generated by the encoder, thereby preventing the overflow and underflow conditions. Rate control algorithms play an important role in affecting image quality and compression efficiency.

In one embodiment, the proper selection of the quantization parameter (QP) for a macroblock (MB) in the rate control module 130 is determined in accordance with the method of the present invention. Existing video coding standards allow adjusting the quantization stepsize $Q_{step}$ locally, in particular, at the MB level. Rate control can therefore be achieved by controlling the quantization stepsize $Q_{step}$ per MB. The rate control algorithms based upon other video coding standards, such as the most commonly used MPEG2 TM5 rate control or like, cannot be directly applied to the H.264/MPEG-4 AVC encoder. This is because H.264 blends the transform and quantization operations together, and it only allows the change in QP per MB. QP is a quantization parameter, not the quantization stepsize $Q_{step}$. Rate control for the H.264/MPEG-4 AVC encoder can only be achieved by properly selecting value of QP. As discussed above, there are a total of 52 possible values in QP.

Figure 2:
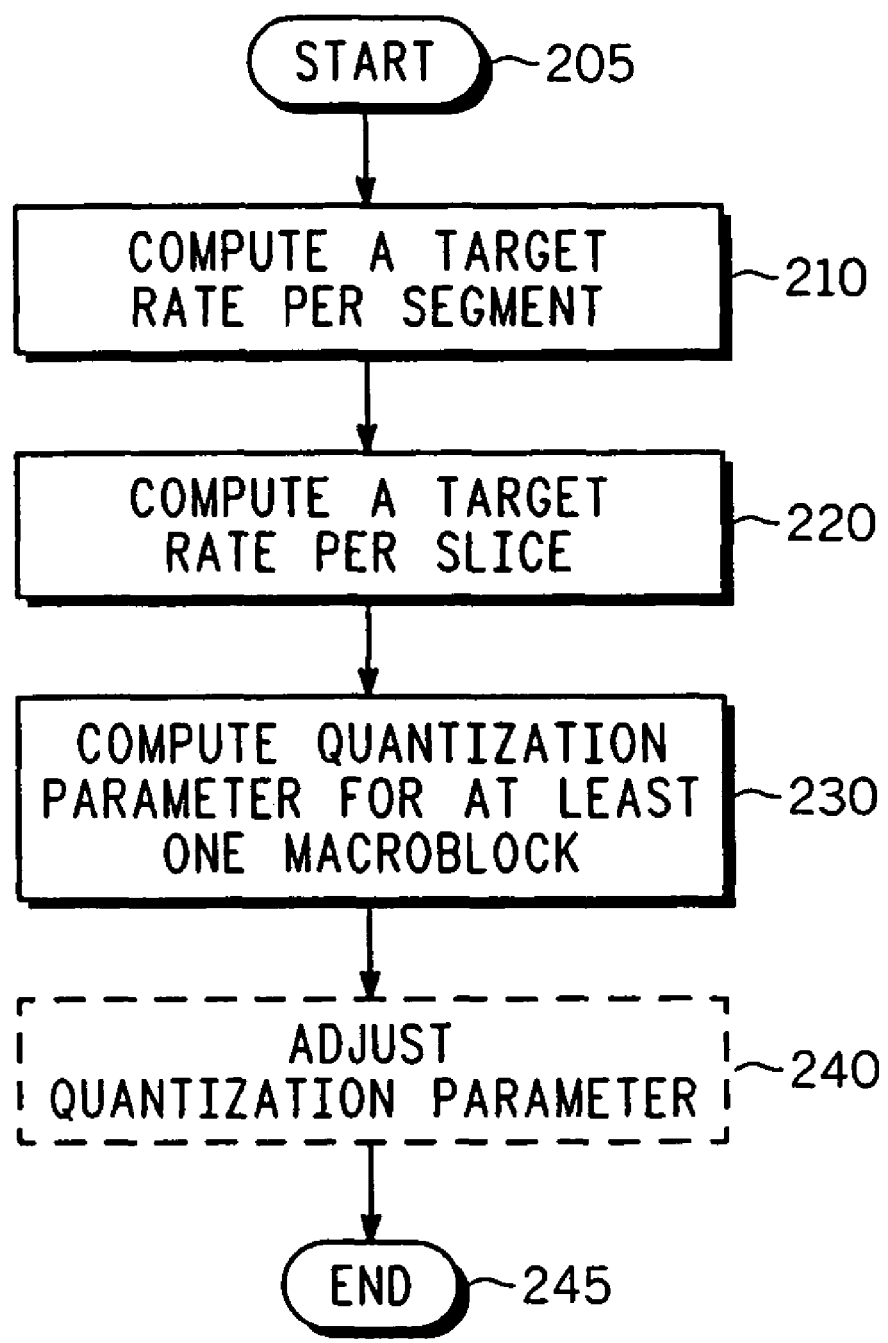
FIG. 2 illustrates a method for performing rate control of the present invention.

FIG. 2 illustrates a method 200 for FIG. 2 illustrates a method for performing rate control of the present invention. Method 200 starts in step 205 and proceeds to step 210.

In step 210, method 200 computes a target rate per "segment". In this document, "a target rate for a segment" is typically expressed as a number of bits that are within the segment and is alternatively referred to as the "target number of bits" in the segment. A segment is defined over the video sequence along the time domain, for example, a segment of two seconds, of one second, or of half a second. The segment contains an integer number of slices. It should be noted that H.264/MPEG-4 AVC is a slice-based, instead of a picture-based, coding standard. A slice contains an integer number of MBs. A slice can be a whole picture or a part of a picture. In H.264/MPEG-4 AVC, each slice can have its own type, e.g., I, P or B. The present invention assigns a target number of bits for a current slice derived from a target rate of a segment that is subject to the target bit rate of "bit_rate" in bits per second. The term "bit_rate" represents an output rate of the encoder or a desired rate of the encoder.

In one embodiment, given a target bit rate of bit_rate, a segment should be budgeted a target number of bits as follows:

$$R_{segment} = \frac{MB\_seg}{MB\_sec} \times bit\_rate, \quad (1)$$

where MB_seg is the total number of MBs in the current segment and MB_sec is the total number of MBs per second.

The size of a segment may be updated after encoding each slice within the segment. The target number of bits for the current segment should therefore be updated accordingly. Two methods for segment updating are described below.

The first method is the sliding window method, in which a new slice is included in the current segment after a slice is encoded and moved out. After encoding a slice, the target number of bits, $R_{segment}$ for the current segment is updated as:

$$R_{segment} = (R_{segment} - R_{slice}) + \frac{MB\_slice}{MB\_sec} \times bit\_rate \quad (2)$$

where $R_{segment}$ on the right side of the equal sign is the target number of bits assigned for the segment before the slice is encoded, $R_{slice}$ is the number of bits generated for the encoded slice MB_slice is the total number of MBs in a new slice. Note that the quantity in brackets on the right is the number of bits left after removing the bits used for the encoded slice, and the second item is the number of bits budgeted for the new slice. At the beginning of a sequence, $R_{segment}$ should be set using equation (1).

To illustrate, if $R_{segment}$ comprises slices 1-10, then when slice 0 is encoded, the actual bit rate $R_{slice}$ used to encode the slice is subtracted from the $R_{segment}$. However, since the current method of updating $R_{segment}$ is a sliding window approach, then the estimated bits for the next slice of the window, e.g., slice 11 (e.g., MB_slice$_{11}$/MB_sec×bit_rate) is added to $R_{segment}$.

In the second method called the consumption method, no new slice is included in the current segment after encoding a slice until all the slices in the current segment are encoded. Before encoding a new slice, the target number of bits for the current segment is updated as follows:

$$R_{segment} = R_{segment} - R_{slice} \quad (3)$$

If the target segment rate $R_{segment}$ is perfectly calculated, then it is assumed that when all the slices within the segment have been encoded, all the bits are consumed exactly. However, in real operation, that is not the case. Often, the target segment rate $R_{segment}$ is slightly off, leaving some unused bits or needing some additional bits. The deficit or surplus (the right $R_{segment}$ in equation 4 below) will be added or subtracted to the next $R_{segment}$ in accordance with equation (4) below.

Thus, at the beginning of a new segment, $$R_{segment} = R_{segment} + \frac{MB\_seg}{MB\_sec} \times bit\_rate, \quad (4)$$

where at the beginning of a sequence, $R_{segment}$ on the right is set to zero.

Returning to FIG. 2, once a target rate for a segment has been computed, method 200 proceeds to step 220. In step 220, method 200 computes a target rate for each slice. In this document, "the target rate for a slice of macroblocks" is expressed as a number of bits in the slice of macroblocks, and is alternatively referred to as the target number of bits in the slice of macroblocks.

In one embodiment, given a target number of bits for a segment, a slice of type I, P or B should be allocated a target number of bits, $R_{target}$, according to its relative complex measure, $C_{type}$, over other slices within the current segment, that is:

$$R_{target} \propto C_{type} | R_{segment} \quad (5)$$

The $R_{segment}$ in equation 5 can be taken from equations (2) or (3).

In one embodiment, a specific formula is as follows:

$$R_{target} = \frac{K_{type} \times MB_{slice} \times C_{type}}{K_I \times MB_I \times C_I + K_P \times MB_P \times C_P + K_B \times MB_B \times C_B} R_{segment} \quad (6)$$

where
type indicates the current slice type which can be I, P or B.
$C_I$, $C_P$ and $C_B$ are the complex measure for the slice of type I, P and B.

For example, the complex measure for slice of type I, P and B can be the product of average quantization parameter used and the number of bits generated for the last slice of the same type.

$K_P$ and $K_B$ are the pre-set constants for slices of type I, P and B. For example, $K_I = K_P = 1$ and $K_B = 1/1.4$.

$MB_I$, $MB_P$ and $MB_B$ are the total number of MBs in I, P and B slices in the current segment. Note that $MB_I + MB_P + MB_B$ is the total number of MBs in the current segment.

Returning to FIG. 2, once a target rate for a slice has been computed, method 200 proceeds to step 230. In step 230, method 200 computes a quantization parameter for at least one macroblock.

In one embodiment, rate control is achieved by adjusting quantization parameter QP along encoding MBs. QP can be adjusted per MB, per a group of MBs, or per slice. This step determines a reference quantization parameter, QP, at MB (j) subject to the target number of bits assigned for the current slice, $R_{target}$. The fullness of a virtual buffer for a slice of type I, P or B at MB (j) is first computed as:

$$d_j^{type} = d_0^{type} + B_{j-1} - (j-1) \times \frac{R_{target}}{MB\_slice}, \quad (7)$$

where $d_0^{type}$ is the initial fullness of virtual buffer at the beginning of the current slice of type I, P or B. The final fullness of virtual buffer $d_j^{type}$, j=MB_slice, is used as $d_0^{type}$ for encoding the next slice of the same type. The initial value of the virtual buffer fullness can be set to:

$$d_0^I = \frac{10}{31} \times 2 \times \frac{MB\_slice}{MB\_sec} \times bit\_rate, \; d_0^P = d_0^I/K_P \text{ and } d_0^B = d_0^I/K_B.$$

$B_{j-1}$ is the number of bits generated for encoding all the MBs in the current slice up to and including MB (j−1).
MB_slice is the total number of MBs in the current slice.
The quantization stepsize for the current MB (j) should be proportional to the fullness of virtual buffer, that is, $$Q_j = \alpha \times d_j, \quad (8)$$

where α may be a function of bit_rate, picture_rate, and so on. For example, $$\alpha = \frac{31 \times MB\_sec}{2 \times MB\_slice \times bit\_rate} \quad (9)$$

The quantization stepsize $Q_j$ is then converted into the reference quantization parameter by $$QP_j = [6 \times \log_2(Q_j) + c] \quad (10)$$

where constant "c" can take one of six values as shown in Table 1, depending upon $Q_j$.

In one embodiment, the method for determining the value of constant c is as follows:
Step 0. Set $Q_{temp}=Q_j$, where $Q_{temp}$ is an arbitrary variable.
Step 1. If $Q_{temp}<0.6250$, then $Q_{temp}=0.6250$. If $Q_{temp}>224$, then $Q_{temp}=224$,
Step 2. If $0.6250 \leq Q_{temp} \leq 1.1250$, go to step 4. Otherwise, go to step 3.
Step 3. $Q_{temp}=Q_{temp}/2$, and then go back to step 1.
Step 4. Round $Q_{temp}$ into one of the five values shown in Table 1, that is, $Q_{final\_temp}=[Q_{temp}]$.
Step 5. The 3rd column in Table 1 shows the corresponding constant c.

TABLE 1

| | Constant c | |
| --- | --- | --- |
| QP %6 | $Q_{final\_temp}$ | c |
| 0 | 0.6250 | 4.06843 |
| 1 | 0.6875 | 4.24341 |
| 2 | 0.8125 | 3.79736 |
| 3 | 0.8750 | 4.15587 |
| 4 | 1.0000 | 4.00000 |
| 5 | 1.1250 | 3.98045 |

To illustrate the use of Table 1, assume $Q_j$ has an initial value of 20 (e.g., derived from Equ. 8). Since $Q_j$ is 20, both conditions in steps 1 and 2 are not satisfied and step 3 is applied ($Q_j=20/2=10$). It can be seen that steps 1, 2 and 3 are repeatedly performed, until $Q_j=0.625$. Then, step 4 is performed, where 0.625 is rounded to 0.625. In turn, cross referencing to the third column, c is selected to be 4.06843.

Alternatively, since the six (6) possible values are centered around the value of 4, in one embodiment, c can simply be predefined to be a value of 4 or some other values between (3.79736–4.24341). In this manner, computational cycles are not spent in the calculation of c at the expense of a slight variation in the computed $QP_j$.

Returning to FIG. 2, once a $QP_j$ has been computed, method 200 will apply the $QP_j$ in the encoding process and ends in step 245. It should be noted that one or more steps of method 200 can be repeated for the next segment and so on.

In one embodiment, method 200 employs an optional step to adjust the QP to account for human eye sensitivity. Human eye has non-uniform sensitivity to the coding distortion at different frequencies. In general, the distortion in a static flat area is more visible than in the busy noise area. Hence, the quantization parameter $QP_j$ determined above is further modulated in order to address this characteristic of human vision system. This step describes the modulation process for a given $QP_j$.

In one embodiment, given a MB (j), a spatial local activity measure is computed from its MB/sub_MB partitions of (n,m) pixels in both frame and field format using the original pixel values, that is, $$act_j = 1 + \min(var\_block_k | k=1, 2, \ldots, 2 \times (16/n) \times (16/m)) \quad (11)$$

where $var\_block_k$ is the variance of MB/sub_MB partition (k), defined as $$var\_block_k = \frac{1}{n \times m} \sum_{i,j=0}^{n,m} (x_k(i,j) - mean\_block_k)^2 \quad (12)$$

$$mean\_block_k = \frac{1}{n \times m} \sum_{i,j=0}^{n,m} x_k(i,j) \quad (13)$$

and $x_k(i,j)$ are the original pixel values of MB/sub_MB partition (k). Normalized local activity is then given by:

$$N\_act_j = \frac{\beta \times act_j + avg\_act}{act_j + \beta \times avg\_act} \quad (14)$$

where β is a constant and avg_act is the average value of $act_j$ of the last encoded slice or the current slice. For the first slice, avg_act may be set to a value of 400. The reference quantization parameter $QP_j$ is now modulated by $N\_act_j$, giving the final $QP_j$ for the current MB (j) by, $$QP_j = QP_j + 6 \times \log_2(N\_act_j) \quad (15)$$

The range of modulation is controlled by β. For example, for β=2, the range of modulation is [½, 2] in equation (14), or [−6, 6] in equation (15). The final $QP_j$ may need to be further clipped into the allowable range of [0, 51].

Figure 3:
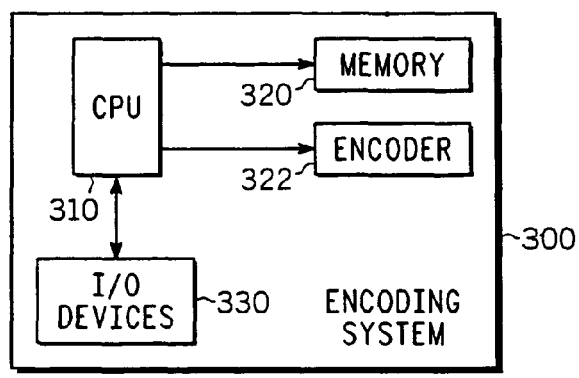
FIG. 3 illustrates the present invention implemented using a general purpose computer.

FIG. 3 is a block diagram of the present encoding system being implemented with a general purpose computer. In one embodiment, the encoding system 300 is implemented using a general purpose computer or any other hardware equivalents. More specifically, the encoding system 300 comprises a processor (CPU) 310, a memory 320, e.g., random access memory (RAM) and/or read only memory (ROM), an encoder 322 employing the present method of biasing towards the I Frame bit budget, and various input/output devices 330 (e.g., storage devices, including but not limited to, a tape drive, a floppy drive, a hard disk drive or a compact disk drive, a receiver, a transmitter, a speaker, a display, an output port, a user input device (such as a keyboard, a keypad, a mouse, and the like), or a microphone for capturing speech commands).

It should be understood that the encoder 322 can be implemented as physical devices or subsystems that are coupled to the CPU 310 through a communication channel. Alternatively, the encoder 322 can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory 320 of the computer. As such, the encoder 322 (including associated data structures and methods employed within the encoder) of the present invention can be stored on a computer readable medium or carrier, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

The invention claimed is:

1. A method for providing a rate control in an encoder apparatus for encoding an image sequence, comprising:

computing a target rate for a segment, wherein said segment comprises at least one slice of macroblocks;

computing a target rate for said at least one slice of macroblocks from said target rate for said segment;

computing a quantization parameter ($QP_j$) for a macroblock (j) of said macroblocks from said target rate for said at least one slice; and encoding said macroblock (j) in accordance with said quantization parameter ($QP_j$), wherein said quantization parameter ($QP_j$) is computed from a quantization stepsize $Q_j$, and wherein said quantization parameter $QP_j$ is computed as follows:

$$QP_j = \lfloor 6 \times \log_2(Q_j) + C \rfloor,$$

where c is a constant.

2. The method of claim 1, wherein said encoder is a H.264/MPEG-4 AVC compliant encoder.

3. The method of claim 1, wherein said target rate for said segment ($R_{segment}$) is updated in accordance with a sliding window of slices or a consumption method.

4. The method according to claim 1, wherein said target rate for said segment ($R_{segment}$) is nominally set as follows:

$$R_{segment} = \frac{MB\_seg}{MB\_sec} \times bit\_rate,$$

where MB_seg is a total number of said macroblocks (MBs) in said segment, MB_sec is a total number of MBs per second, and where bit_rate is an output rate of said encoder, wherein said target rate ($R_{target}$) for said at least one slice of macroblocks is computed as follows:

$$R_{target} = \frac{K_{type} \times MB_{slice} \times C_{type}}{K_I \times MB_I \times C_I + K_P \times MB_P \times C_P + K_B \times MB_B \times C_B} R_{segment}.$$

where type indicates a slice type of I, P or B, where $C_I$, $C_P$ and $C_B$ are complex measure for the corresponding slice type of I, P and B, where $K_I$, $K_P$ and $K_B$ are pre-set constants for corresponding slice type of I, P and B, and where $MB_I$, $MB_P$ and $MB_B$ are total number of MBs in corresponding I, P and B slices in said segment.

5. The method of claim 1, wherein said $Q_j$ is proportional to a fullness measure of a virtual buffer, $d_j$, as follows:

$$Q_j = \alpha \times d_j,$$

where $\alpha$ is at least one of a function of bit_rate and picture_rate.

6. The method of claim 5, wherein said $\alpha$ is computed as follows:

$$\alpha = \frac{31 \times MB\_sec}{2 \times MB\_slice \times bit\_rate},$$

where MB_slice is a total number of MBs in a new slice.

7. The method of claim 1, wherein said quantization parameter $QP_j$ is adjusted to account for human eye sensitivity.

8. A tangible computer-readable medium having stored thereon a plurality of instructions, the plurality of instructions including instructions which, when executed by a processor, cause the processor to perform the steps of a method for providing a rate control in an encoder for encoding an image sequence, comprising of:

computing a target rate for a segment, wherein said segment comprises at least one slice of macroblocks;

computing a target rate for said at least one slice of macroblocks from said target rate for said segment;

computing a quantization parameter ($QP_j$) for a macroblock (j) of said macroblocks from said target rate for said at least one slice; and encoding said macroblock (j) in accordance with said quantization parameter ($QP_j$), wherein said quantization parameter ($QP_j$) is computed from a quantization stepsize $Q_j$, and wherein said quantization parameter $QP_j$ is computed as follows:

$$QP_j = \lfloor 6 \times \log_2(Q_j) + c \rfloor,$$

where c is a constant.

9. The tangible computer-readable medium of claim 8, wherein said target rate for said segment ($R_{segment}$) is updated in accordance with a sliding window of slices or a consumption method.

10. The tangible computer-readable carrier of claim 8, wherein said target rate for said segment ($R_{segment}$) is nominally set as follows:

$$R_{segment} = \frac{MB\_seg}{MB\_sec} \times bit\_rate,$$

where MB_seg is a total number of said macroblocks (MBs) in said segment, MB_sec is a total number of MBs per second, and where bit_rate is an output rate of said encoder, wherein said target rate ($R_{target}$) for said at least one slice of macroblocks is computed as follows:

$$R_{target} = \frac{K_{type} \times MB_{slice} \times C_{type}}{K_I \times MB_I \times C_I + K_P \times MB_P \times C_P + K_B \times MB_B \times C_B} R_{segment}.$$

where type indicates a slice type of I, P or B, where $C_I$, $C_P$ and $C_R$ are complex measure for the corresponding slice type of I, P and B, where $K_I$, $K_P$ and $K_B$ are pre-set constants for corresponding slice type of I, P and B, and where $MB_I$, $MB_P$ and $MB_B$ are total number of MBs in corresponding I, P and B slices in said segment.

11. The tangible computer-readable medium of claim 8, wherein said $Q_j$ is proportional to a fullness measure of a virtual buffer, $d_j$, as follows:

$Q_j = \alpha \times d_j,$ where $\alpha$ is at least one of a function of bit_rate and picture_rate.

12. The tangible computer-readable medium of claim 11, wherein said $\alpha$ is computed as follows:

$$\alpha = \frac{31 \times MB\_sec}{2 \times MB\_slice \times bit\_rate},$$

where MB_slice is a total number of MBs in a new slice.

13. The tangible computer-readable medium of claim 8, wherein said encoder is a H.264/MPEG-4 AVC compliant encoder.

14. An apparatus for providing a rate control in an encoder for encoding an image sequence, comprising:
  means for computing a target rate for a segment, wherein said segment comprises at least one slice of macroblocks;
  means for computing a target rate for said at least one slice of macroblocks from said target rate for said segment;
  means for computing a quantization parameter ($QP_j$) for a macroblock (j) of said macroblocks from said target rate for said at least one slice; and
  means for encoding said macroblock (j) in accordance with said quantization parameter ($QP_j$), wherein said quantization parameter ($QP_j$) is computed from a quantization stepsize $Q_j$, and wherein said quantization parameter $QP_j$ is computed as follows:

$QP_j = \lfloor 6 \times \log_2(Q_j) + c \rfloor,$ where c is a constant.

15. A method for providing a rate control in an encoder apparatus for encoding an image sequence, comprising:
  computing a target rate for a segment, wherein said segment comprises at least one slice of macroblocks;
  computing a target rate for said at least one slice of macroblocks from said target rate for said segment;
  computing a quantization parameter ($QP_j$) for a macroblock (j) of said macroblocks from said target rate for said at least one slice; and
  encoding said macroblock (j) in accordance with said quantization parameter ($QP_j$), wherein an adjustment of ($QP_j$) is computed as follows:

$QP_j = QP_j + 6 \times \log_2(N\_act_j),$ wherein $N\_act_j$ is a normalized local activity.

16. The method of claim 15, wherein $N\_act_j$ is computed as follows:

$$N\_act_j = \frac{\beta \times act_j + avg\_act}{act_j + \beta \times avg\_act},$$

wherein $\beta$ is a constant and avg_act is an average value of $act_j$ of a current slice, and wherein $act_j$ is computed as follows:

$act_j = 1 + \min(var\_block_k | k=1, 2, \ldots 2 \times (16/n) \times (16/m)),$ wherein var_block is a variance of MB/sub_MB partition (k) computed as follows:

$$var\_block_k = \frac{1}{n \times m} \sum_{i,j=0}^{n,m} (x_k(i, j) - mean\_block_k)^2,$$

wherein $mean\_block_k$ is computed as follows:

$$mean\_block_k = \frac{1}{n \times m} \sum_{i,j=0}^{n,m} x_k(i, j),$$

wherein $x_k(i,j)$ is the original pixel value of pixel (i,j) of MB/sub_MB partition (k).

17. The method of claim 7, wherein the adjustment is proportional to a normalized local activity measure as follows:

$QP_j = QP_j + 6 \times \log_2(N\_act_j),$ wherein $N\_act_j$ is a normalized local activity.

18. The method of claim 17, wherein $N\_act_j$ is computed as follows:

$$N\_act_j = \frac{\beta \times act_j + avg\_act}{act_j + \beta \times avg\_act},$$

wherein $\beta$ is a constant and avg_act is an average value of $act_j$ of a current slice, and wherein $act_j$ is computed as follows:

$act_j = 1 + \min(var\_block_k | k=1, 2, \ldots 2 \times (16/n) \times (16/m)),$ wherein var_block is a variance of MB/sub_MB partition (k) computed as follows:

$$var\_block_k = \frac{1}{n \times m} \sum_{i,j=0}^{n,m} (x_k(i, j) - mean\_block_k)^2,$$

wherein $mean\_block_k$ is computed as follows:

$$mean\_block_k = \frac{1}{n \times m} \sum_{i,j=0}^{n,m} x_k(i, j),$$

wherein $x_k(i,j)$ is the original pixel value of pixel (i,j) of MB/sub_MB partition (k).

\* \* \* \* \*